(12) United States Patent
Cong

(10) Patent No.: US 6,420,997 B1
(45) Date of Patent: Jul. 16, 2002

(54) TRACK MAP GENERATOR

(75) Inventor: Shan Cong, Ann Arbor, MI (US)

(73) Assignee: Automotive Systems Laboratory, Inc., Farmington Hills, MI (US)

( * ) Notice: Subject to any disclaimer, the term of this patent is extended or adjusted under 35 U.S.C. 154(b) by 0 days.

(21) Appl. No.: 09/877,493

(22) Filed: Jun. 8, 2001

Related U.S. Application Data

(60) Provisional application No. 60/210,193, filed on Jun. 8, 2000, and provisional application No. 60/210,878, filed on Jun. 9, 2000.

(51) Int. Cl.$^7$ ............................................. G01S 13/93
(52) U.S. Cl. ........................... 342/70; 342/71; 342/72; 701/301
(58) Field of Search ........................... 342/70, 71, 72; 701/48, 33, 36, 93, 96, 117, 200, 301; 340/901, 436; 180/167, 170

(56) References Cited

U.S. PATENT DOCUMENTS

| | | | |
|---|---|---|---|
| 2,709,804 A | 5/1955 | Chance et al. | 342/96 |
| 3,177,485 A | 4/1965 | Taylor, Jr. | 342/96 |
| 3,603,994 A | 9/1971 | Williams et al. | 342/96 |
| 3,699,573 A | 10/1972 | Andrews et al. | 342/96 |
| 3,725,918 A | 4/1973 | Fleischer et al. | 343/5 EM |
| 3,869,601 A | 3/1975 | Metcalf | 392/450 |
| 3,971,018 A | 7/1976 | Isbister et al. | 343/5 CD |
| 4,623,966 A | 11/1986 | O'Sullivan | 364/461 |
| 5,051,751 A | 9/1991 | Gray | 342/107 |
| 5,138,321 A | 8/1992 | Hammer | 342/36 |
| 5,170,440 A | 12/1992 | Cox | 382/199 |
| 5,202,691 A | 4/1993 | Hicks | 342/90 |
| 5,307,289 A | 4/1994 | Harris | 364/400 |
| 5,343,206 A * | 8/1994 | Ansaldi et al. | 342/70 |
| 5,402,129 A * | 3/1995 | Gellner et al. | 342/70 |
| 5,406,289 A | 4/1995 | Barker et al. | 342/96 |
| 5,471,214 A | 11/1995 | Faibish et al. | 342/70 |
| 5,537,119 A | 7/1996 | Poore, Jr. | 342/96 |
| 5,587,929 A * | 12/1996 | League et al. | 342/159 |
| 5,627,768 A | 5/1997 | Uhlmann et al. | 702/109 |
| 5,633,642 A | 5/1997 | Hoss et al. | 342/70 |
| 5,657,251 A * | 8/1997 | Fiala | 342/162 |
| 5,668,739 A * | 9/1997 | League et al. | 382/103 |
| 5,689,264 A | 11/1997 | Ishikawa et al. | 342/70 |
| 5,703,593 A | 12/1997 | Campbell et al. | 342/96 |
| 5,948,043 A | 9/1999 | Mathis | 701/208 |
| 5,959,552 A | 9/1999 | Cho | 340/903 |
| 5,959,574 A | 9/1999 | Poore, Jr. | 342/96 |
| 6,085,151 A * | 7/2000 | Farmer et al. | 701/301 |
| 6,161,071 A | 12/2000 | Shuman et al. | 701/48 |
| 6,226,389 B1 | 5/2001 | Lemelson et al. | 382/104 |
| 6,275,231 B1 | 8/2001 | Obradovich | 345/349 |
| 6,275,773 B1 | 8/2001 | Lemelson et al. | 701/301 |

* cited by examiner

Primary Examiner—John B. Sotomayor
(74) Attorney, Agent, or Firm—Dinnin & Dunn, P.C.

(57) ABSTRACT

A radar system (14, 20, 22) generates a plurality of data points (x, y) representative of the position of a tracked object (48), and a representation of an associated path (50, 60) is formed therefrom. At least one quality measure, and at least one heading measure, of said representation, is calculated corresponding to at least one map coordinate (44). The quality and heading measures are stored in memory as a track map. Data from other tracked objects (58) is used to update the track map (38), resulting a plurality of heading values at associated map coordinates (44) that are representative of a path (42) followed by the tracked objects (48, 58).

7 Claims, 5 Drawing Sheets

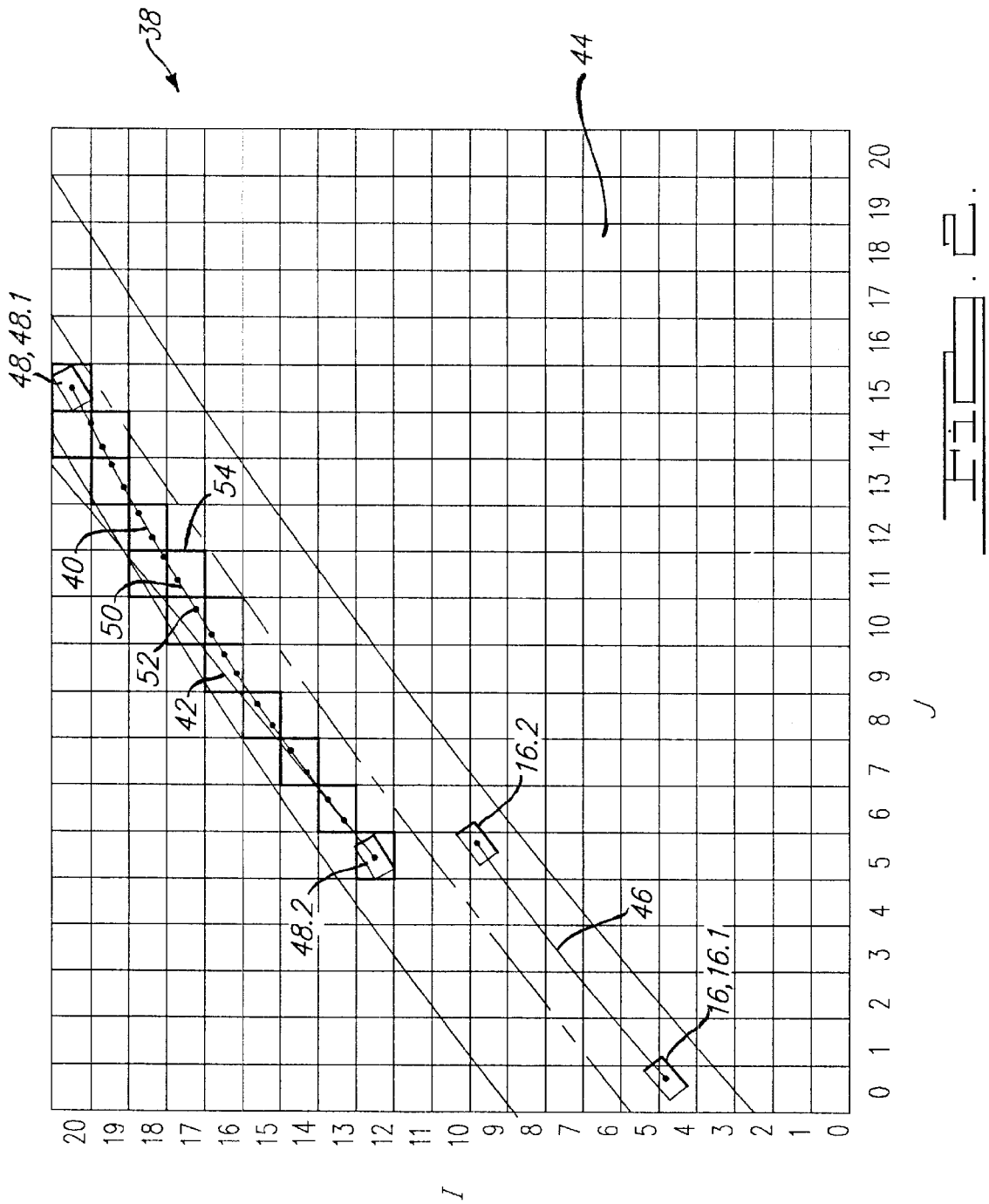

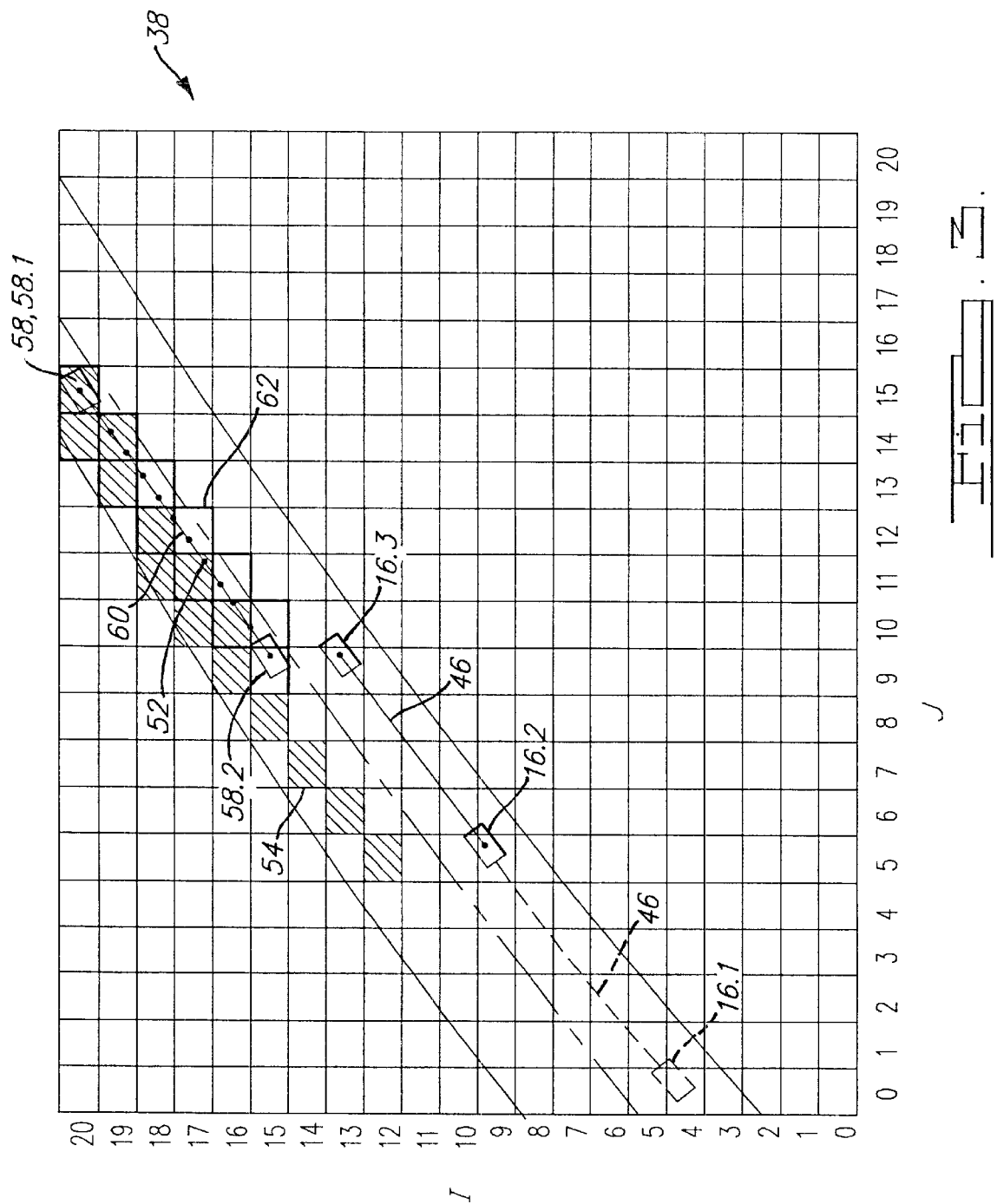

TRACK MAP GENERATOR

The instant application claims the benefit of U.S. Provisional Application Serial No. 60/210,193 filed on Jun. 8, 2000, and of U.S. Provisional Application Serial No. 60/210,878 filed on Jun. 9, 2000, both of which applications are incorporated herein by reference.

In the accompanying drawings:

FIG. 2 illustrates an example of a target tracking situation during a first period of time;

FIG. 3 illustrates an example of a target tracking situation during a second period of time after the first period of time of FIG. 2;

Figure 1:
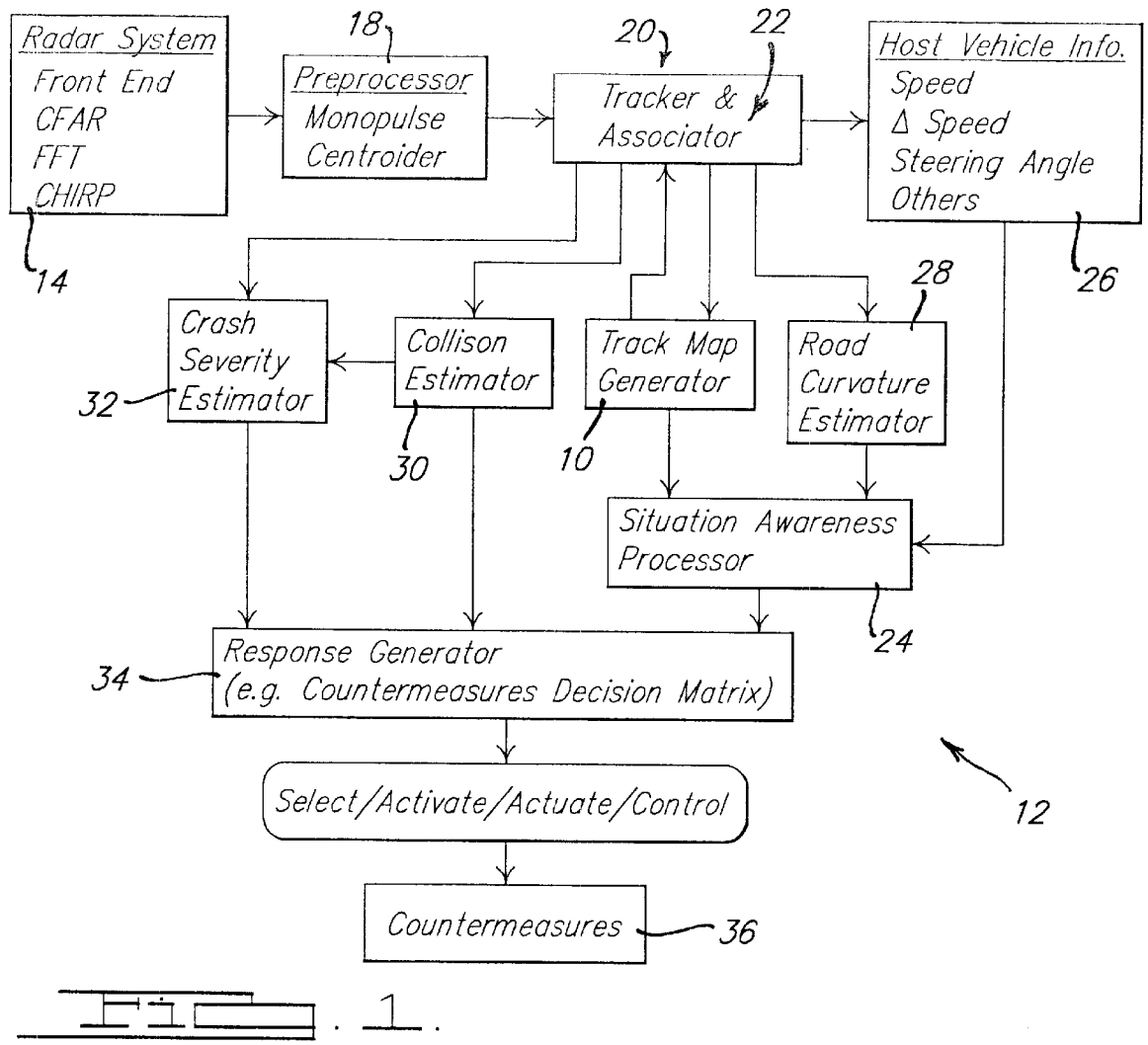
FIG. 1 illustrates a block diagram of a radar processing system that incorporates the instant invention.

There exists a need for an improved predictive collision sensing or collision avoidance system for automotive applications that can sense and identify an environment of a host vehicle with sufficient range and accuracy so that proper countermeasures can be selected and taken sufficiently early to either avoid a collision or to mitigate injury therefrom either to occupants of the host vehicle or to pedestrians thereto. As used herein, the term predictive collision sensing system will also refer to a collision avoidance system to mean a system that can sense and track targets in the environment of the host vehicle, and then either suggest, or automatically take countermeasures, that would improve safety. Generally, a predictive collision sensing system tracks the motion of the host vehicle relative to its environment, or vice versa, for example, using a radar system with an associated target tracker. The environment may include both stationary and moving targets. An automotive environment is distinguished from other target tracking environments—for example, that of air or sea vessels—in that automotive vehicles are primarily operated in an environment that is constrained by roadways. There are, of course, exceptions to this, for example, parking lots or off-road driving conditions, but these exceptions generally occupy a relatively small amount of vehicular operating time, or a relatively small risk of collisions that would benefit from a predictive collision sensing system.

If available, knowledge of roadway constraints, for example, in the form of a map, can be useful in improving the performance of a predictive crash sensing system. For example, if the host vehicle is known to be operating on a particular roadway having a particular path geometry, and an on-board navigation system detects that the trajectory of the vehicle is departing from that path, for example as a result of a skid or driver inattention, then the predictive collision system could identify and react to this situation, whether or not the on-board radar detected a potential target with which the host vehicle might collide.

Knowledge of roadway constraints can also be used to improve the convergence of an associated target tracker, or to improve an estimate of the environment or situation in which the host vehicle is operated.

Roadway constraints are generally characterized in the form of a map of associated coordinates in a two-dimensional space. For example, road trajectories can be plotted in an X-Y coordinate system with positive X directed North, and positive Y directed East. Whereas digitized road maps are presently widely available, the extent of the utility thereof in a predictive crash sensing system of a host vehicle is at least partially dependent upon a navigation process to locate the host vehicle on the map assuming that the maps are of sufficient. For example, the location and direction of a vehicle can be measured by a GPS receiver; by a dead reckoning system using measurements of vehicle heading from a compass or directional gyroscope, and vehicle distance and heading from wheel speed or rotation measurements, in conjunction with a map matching algorithm; or a combination of the two. However, heretofore available navigation systems are generally not sufficiently accurate to provide a map of the roadway traveled by the host vehicle, of sufficient accuracy for predictive crash sensing. Moreover, road conditions can change over time, for example, as a result of road construction, and these changes may not always be timely entered into the associated digital maps.

Accordingly, there exists a need for an improved system and method for generating a map of a track or tracks over which follow the host vehicle and other vehicles in the environment of the host vehicle.

Referring to FIGS. 1–3, a track map generator 10 is illustrated in a radar processing system 12 for processing radar data from a radar system 14 incorporated in a host vehicle 16, is equipped with a sensor for sensing targets in the environment thereof and for actuating and/or controlling associated countermeasures responsive to the relative motion of the host vehicle and one or more targets. The sensor for sensing targets is for example a radar or lidar sensor system that senses and tracks the location of targets relative to the host vehicle, and predicts if a collision between the host vehicle and the target is likely to occur, for example, as disclosed in U.S. Pat. No. 6,085,151, assigned to the assignee of the instant invention, and incorporated by reference herein.

For example, referring to FIG. 1, illustrating a block diagram of a radar processing system 12, each block in the block diagram comprises associated software modules that receive, prepare and/or process data provided by a radar system 14 mounted in the host vehicle. Data from the radar system 14 is preprocessed by a preprocessor 18 so as to generate radar data, for example, range, range rate, azimuth angle, and quality thereof, suitable for target tracking. The radar data may typically covers a wide field of view forward of the host vehicle, at least +/−5 degrees from the host vehicle's longitudinal axis, and possibly extending to +/−180 degrees or larger depending upon the radar and associated antenna configuration. A present exemplary system has a field of view of +/−55 degrees.

A tracker 20 converts radar output data (range, range rate & azimuth angle) into target speed and x-y coordinates specifying the location of a target. For example, the system of Application '035 discloses a system, for tracking multiple targets, and for clustering associated radar data for a single target. The associator 22 relates older track data to that from the latest scan, compiling a track history of each target.

The track map generator 10—described more fully hereinbelow—stores this data, and generates a track map therefrom as a record of the progress of target motions relative to the host vehicle.

A situation awareness processor 24 uses 1) the track map, 2) data acquired indicating the motion of the host vehicle, i.e. host vehicle information 26, and possibly 3) "environmental data", to determine the most likely or appropriate driving situation from a set of possible driving situations. For example, the "environmental data" can include GPS data, digital maps, real-time radio inputs of highway geometry and nearby vehicles, and data from real-time transponders such as electromagnetic or optical markers built into highways. For example, the "environmental data" can be used by a road curvature estimator 28 to provide an estimate of road curvature to the situation awareness processor 24.

The situation awareness processor 24 stores and interprets the track map from the track map generator 10, and compares the progress over time of several target tracks. Evaluation of the relative positions and progress of the tracked targets permits identification of various driving situations, for example a location situation, a traffic situation, a driving maneuver situation, or the occurrence of sudden events.

The situation estimated by the situation awareness processor 24, together with collision and crash severity estimates from a collision estimator 30 and a crash severity estimator 32 respectively, are used as inputs to a response generator 34 to select an appropriate countermeasure 36 for example, using a decision matrix. The decision of a particular response by the response generator 34 may be based on, for example, a rule-based system (an expert system), a neural network, or another decision means.

Examples of countermeasures 36 that can be activated include, a warning device to warn the driver to take corrective action, for example 3D audio warning (for example, as disclosed in U.S. Pat. No. 5,979,586 assigned to the assignee of the instant invention and incorporated by reference herein); various means for taking evasive action to avoid a collision, for example the engine throttle, the vehicle transmission, the vehicle braking system, or the vehicle steering system; and various means for mitigating injury to an occupant if a collision is unavoidable, for example a motorized safety belt pretensioner, or internal or external airbags. The particular one or more countermeasures 36 selected, and the manner by which that one or more countermeasures 36 are activated, actuated, or controlled, depends up the situation identified by the situation awareness processor 24, and upon the collision and crash severity estimates. By way of example, one potential scenario is that the response to encroachment into the host's lane of travel requires a different response depending upon whether the target is coming from the opposite direction or going the same way as the host vehicle, but cutting into the host's lane. By considering the traffic situation giving rise to the threat, the countermeasures 36 can be better adapted to mitigating that threat. By using a radar system, or generally a predictive collision sensing system, to sense targets within range of the host vehicle, the countermeasures 36 may be implemented prior to an actual collision so as to either avoid the collision or to mitigate occupant injury from the collision.

The track map generator 10 operates on an assumption that objects in the field of view of a tracking sensor are subjected to evolving but common path constraints, so that, although they have independent controls, their associated trajectories are correlated with one another. This assumption is generally true for ground target trajectory estimation, where most likely the targets are motor vehicles and are driving on roads where there are strong path restrictions. In such cases, using the constraints will certainly improve both target kinematic states tracking performance and target status estimation performance. Here target status refers to decisions such as the relative position of a target on a road and if a target is making an abnormal maneuver.

Generally a road map is not available that can be updated in real-time to provide instant road condition report, nor can sufficient computation resources be allocated so as to provide a road map in real-time. This limitation is overcome by providing a dynamic map of previous tracks can be used as an a map. A map constructed in this way would not provide information of the first object passing by the sensor, however, as more and more targets are encountered, the accuracy of the map improves, so as to be able to provide more significant information. This map is referred to as a track map 38 because it is built by accumulating previous target tracks.

A track map 38 can be used in a number of ways. For example, by accumulating information in previously existing tracks 40, the convergence speed of a new track can be improved and tracking error at the early stage of a track can be reduced. As another example, as track information is combined into a map, vital information about the current and future traffic situation can also be deduced.

A particular track 40 follows a path 42, and can be characterized by the content and quality of the associated information. The information content is the proposition that at location L a target has states S, and the information quality is the strength with which that proposition is believed to be true. The he information content can have different forms, for example, including but not limited to target speed, heading, acceleration and type. The associated information quality can be evaluated under various reasoning frameworks, such as probability, fuzzy logic, evidential reasoning, or random set.

For example, the track map 38 comprises a Cartesian grid of individual cells located by coordinates i and j, each cell 44—denoted grid(i,j)—has associated state and quality information as follows: grid(i,j).states, and grid(i,j).quality. The resolution and size of the track map 38 is dependent upon the associated computing bandwidth of an associated processor used to generate the track map.

A path 42 is then represented as a collection of grids: {grid(i,j)}. Each time a track is obtained, its associated path 42 can also be deduced. A newly recognized path 42 can then be registered into the track map 38 and the associated information content and quality of the map are also updated. This procedure is called map building. Once a map has been built up, it can be used to improve tracks 40 obtained thereafter. This procedure is called track-map fusion.

Figure 4:
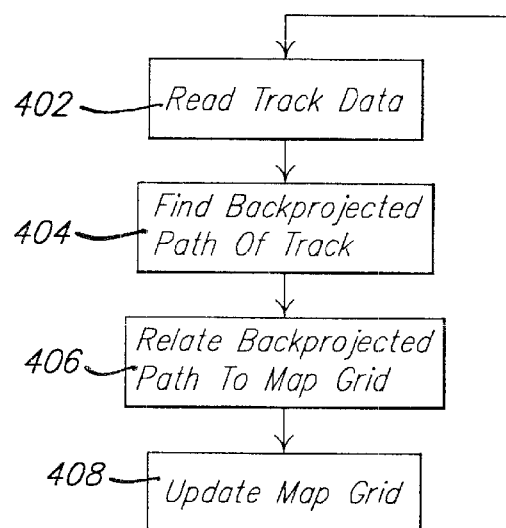
FIG. 4 illustrates a general process in accordance with the instant invention.

Referring to FIG. 4, illustrating a map building process, in step (402) the track data is read from the tracker 20/associator 22. In step (404), the backprojected path of the track is determined, which is then related to the map grid of the track map 38 in step (406). Then in step (408) the map grid is updated, after which the process is repeated in step (402).

Figure 5:
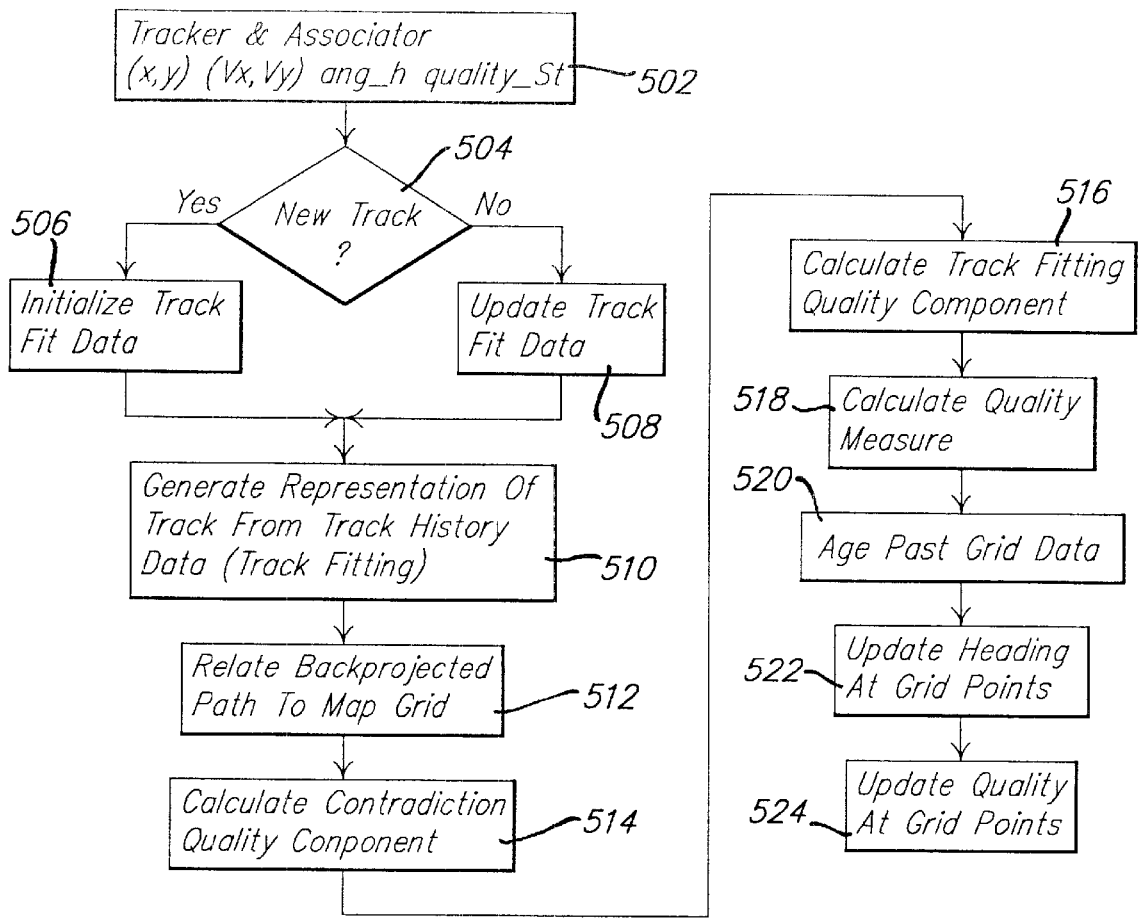
FIG. 5 illustrates a more detailed process in accordance with the instant invention.

Referring to FIG. 5, illustrating the map building and fusion processes in greater detail, in step (502) the track data comprising position (x,y), velocity (Vx, Vy), target angle ang_h, and data quality $S_t$ is read from the tracker 20/associator 22. If, in step (504), the track is new, then in step (506), the track fit data is initialize. For example, accumulators of summation processes associated with the fitting processes are initialized to zero before accumulating new track data thereinto. Otherwise, in step (508), the new track data is accumulated in the associated accumulators used in the fitting process. Then in step (508)—which corresponds to step (404) of FIG. 4, the track history data is processed—for example by a smoothing, regression, or other curve fitting process—to generate a representation of the path of the track.

Referring in greater detail to steps (404) of FIG. 4, and (508) of FIG. 5, generally the backprojected path 42 of a track 40 comprises smoothed trajectory of an existing track 40. As the tracks are obtained from a stochastic calculation, at a specific time an existing track 40 represents the estimated target states based on the information up to that moment. When more information about the target arrives, a better estimate can be derived about the earlier moment. The backprojected path 42 is the improved the history of target states. To obtain a backprojected path 42, one may use Kalman smoother, autoregression, or a line or curve fitting process. The particular approach depends on a tradeoff between nature of target model, performance, available computation bandwidth.

For example, autoregression would be appropriate if the backprojected path 42 is subject to strong trajectory restriction and has a smooth trajectory. A typical curve function in parametric form is:

$$y=f(x)=a_n x^n + a_{n-1} x^{n-1} + \ldots + a_1 x + a_0$$

where $\{a_i, i=0,1,\ldots n\}$ are the results of regression, and jointly define a curve. As another example, the backprojected path may be found by one-dimensional line fitting of the associated track history, as follows:

$$S_x(k) = \sum_{j=1}^{k} x_j f_{fit}^{j-k} = S_x(k-1)f_{fit} + x_k$$

$$S_y(k) = \sum_{j=1}^{k} y_j f_{fit}^{j-k} = S_y(k-1)f_{fit} + y_k$$

$$S_{xy}(k) = \sum_{j=1}^{k} x_j y_j f_{fit}^{j-k} = S_{xy}(k-1)f_{fit} + x_k y_k$$

$$S_x^2(k) = \sum_{j=1}^{k} x_j^2 f_{fit}^{j-k} = S_{x2}(k-1)f_{fit} + x_k^2$$

$$S_w(k) = \sum_{j=1}^{k} f_{fit}^{j-k} = S_w(k-1)f_{fit} + 1$$

$$a=(S_x S_y - S_w S_{xy})/(S_x^2 - S_w S_x^2)$$

$$b=(S_x S_{xy} - S_{x2} S_y)/(S_x^2 - S_w S_x^2)$$

$$d_x = x_1 - x_k$$

$$d_y = y_1 - y_k$$

where a and b are the fitting results which jointly define a straight line pattern:

$$y=ax+b$$

and dx and dy define the distance from the starting point to the current point. Also note that a fading factor is added to gradually decrease the contribution of the early part of a track to current fitting result, for example:

$$f_{fit}=0.98$$

Given a backprojected target trajectory $y=f(x)$, $x \in [x_1, x_N]$ from either steps (406) or step (510), where $x_1 \leq x_N$, in steps (406) and (512) the path 42 of the backprojected target trajectory is associated with the particular cells 44 of the track map 38. For the size of each cell 44 given as $\Delta_x$ and $\Delta_y$ for x and y dimensions respectively, and for the center of grid(0,0) starting at $(x_{g0}, y_{g0})$, then the starting and ending cell locations are given by:

$$x_{g1}=\mathrm{mod}(x_1-x_{g0},\Delta_x)\Delta_x+x_{g0} \text{ and } y_{g1}=\mathrm{mod}(y_1-y_{g0},\Delta_y)\Delta_y+y_{g0}$$

$$x_{gN}=\mathrm{mod}(x_N-x_{g0},\Delta_x)\Delta_x+x_{g0} \text{ and } y_{gN}=\mathrm{mod}(y_N-y_{g0},\Delta_y)\Delta_y+y_{g0}$$

If $|df(x)/dx| \leq 1$, cell locations between the starting and ending cells 44 are found by $$x_i=x_1+i\Delta_x, y_i=f(x_i)$$

and $$x_{gi}=\mathrm{mod}(x_i-x_{g0},\Delta_x)\Delta_x+x_{g0} \text{ and } y_{gi}=\mathrm{mod}(y_i-y_{g0},\Delta_y)\Delta_y+y_{g0}$$

otherwise, $$y_i=y_1+i\Delta_y, x_i=f^{-1}(y_i)$$

and $$x_{gi}=\mathrm{mod}(x_i-x_{g0},\Delta_x)\Delta_x+x_{g0} \text{ and } y_{gi}=\mathrm{mod}(y_i-y_{g0},\Delta_y)\Delta_y+y_{g0}$$

The track map 38 is updated by first calculating the associated quality measures in steps (514), (516) and (518) as follows:

Fitting quality measure of step (518) contains two parts, one is for the contradiction of curve fitting result from step (510) and the output of the tracker 20/associator 22 from step (502); and one is for the difference between a fitted curve (or path 42) and a track 40, i.e., $$M_{fit}=M_{cont}M_{diff}$$

$M_{diff}$ is defined by the distance between the newly found curve and the existing track:

$$M_{diff}=f(\{\|\hat{X}_k - X_k\|, k=1,2,\ldots N\})$$

where $q_{trk}$ is the quality of current track, $\|\cdot\|$ is the distance between a point on a track at time k, $X_k$, and the corresponding backprojected point $\hat{X}_k$, N is the number of points in a track. The simplest form of the distance is an Euclid distance:

$$\|\hat{X}_k - X_k\| = \left\| \left( \sum_{i=0}^{n} a_i x_k^i - y_k \right)^2 \right\|$$

Depending upon the particular situation, the function $f(\{\|\hat{X}_k - X_k\|, k=1,2,\ldots N\})$ can be defined as any monotonic function with output between 0 and 1, as long as it consistently conveys the quality of the fitting and has a set of well defined operations.

$M_{cont}$ denotes contradiction component of quality corresponding to the discrepancy between the fitting result and and the output of the tracker 20/associator 22 from step (502). In each cell 44, the contradiction is reflected by the difference between target heading angle given by the tracker 20/associator 22 and the target heading angle defined by the tangent of the curve at the center of the grid, i.e., $$f(ang\_f, ang\_h) = \begin{cases} |ang\_f - ang\_h|, & \text{if } |anf\_g - ang\_h| < \pi \\ 2\pi - |ang\_f - ang\_h|, & \text{if } |ang\_f - ang\_h| \geq \pi \end{cases}$$

where $$M_{cont}=f(ang\_f, ang\_h)$$

As in the case of $M_{diff}$, $f(ang\_f, ang\_h)$ can be defined as any monotonic function between 0 and 1, as long as the difference between the two angle is reflected.

Finally, before the newly obtained information can be used for updating each grid, one must check the quality of the curve fitting. The this end, each fitting has to consider the following: a) the track should be long enough to guarantee a meaningful fitting; b) the fitting should be well-defined for numerical stability; and c) $M_{diff}$ itself should be small enough to guarantee a good fitting quality.

Figure 6:
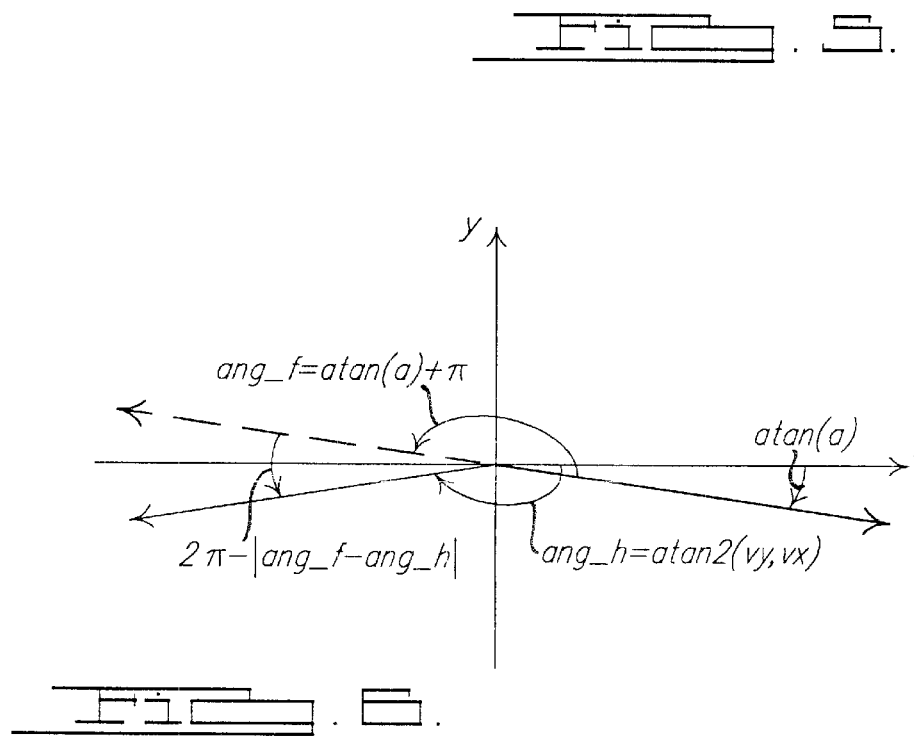
FIG. 6 illustrates a relationship of angular quantities.

As a particular example, the contradiction component of quality can be given by:

$$M_{cont}=S_tS_te^{-2f(ang\_f,ang\_h)}$$

where $$ang\_h=\text{atan } 2(v_y,v_x)$$

$$ang\_f = \begin{cases} atan\left(\frac{df(x)}{dx}\bigg|_{x=x_g}\right), & \text{if } \left|atan\left(\frac{df(x)}{dx}\bigg|_{x=x_g}\right) - ang\_h\right| < \frac{\pi}{2} \\ atan\left(\frac{df(x)}{dx}\bigg|_{x=x_g}\right)+\pi, & \text{if } \left|atan\left(\frac{df(x)}{dx}\bigg|_{x=x_g}\right) - ang\_h\right| \geq \frac{\pi}{2} \end{cases}$$

and $S_t$ is a quality measure from the tracker 20/associator 22 of the current track, ang__f and ang__h are the estimates of the target heading angle obtained from line fitting and the tracker 20/associator 22, respectively. ang__f and ang__h are defined as:

$$ang\_h=\text{atan } 2(v_y,v_x)$$

$$ang\_f = \begin{cases} atan(a), & \text{if } |atan(a) - ang\_h| < \frac{\pi}{2} \\ atan(a)+\pi, & \text{if } |atan(a) - ang\_h| \geq \frac{\pi}{2} \end{cases}$$

wherein vx and vy are estimated target velocities on x and y directions, and the angular relationships are illustrated in FIG. 6.

The difference between a fitted line and the original track:

$$\text{diff} = \sum_{i=k-2}^{k} (x_{fi} - x_i)^2 + (y_{fi} - y_i)^2$$

$$M_{diff}=e_{diff}^{-diff/4}$$

where $(x_{fi},y_{fi})$ and $(x_i,y_i)$ are points on a fitted line and a track, respectively. Here to save computation bandwidth, we use the most recent three points to measure the difference.

The resulting fitting quality measure is the multiplication of Mcont and Mdiff $$M_{fit}=M_{cont}M_{diff}$$

Prior to updating the cells 44 with new information, the old information therein is aged, or faded, in step (520), so as to reduce the significance of cells 44 for which tracking data is no longer measured, and to eventually clear out old data from the cells 44. For example, this may be accomplished by multiplying the information in each grid by a fading factor $f_d$ as follows:

grid$(i,j)$.quality=$f_d(i,j)\times$grid$(i,j)$.quality wherein the fading factor is between zero and one so that the quality of each grid can be degraded to zero if no new information is received therein.

For example, a fading factor may be given by:

$$f_d=0.4e^{-(n_r+1)/(|v|+6)}+0.85$$

where $n_r$ is the number of reports and v is the velocity, if available. The numbers, such as 0.14, 0.85 and 6, are given to tune the decreasing speed.

The track map 38 is then updated in steps (522) and (524) by a backprojection process that updates the grids from starting point to current point. This updating process may be subject to conditions, for example, a) that the track has existed for more than six scans (wherein track length—the number of times a track has been updated—is used as an additional measure for association quality and filtering quality);

b) that the fitting algorithm is well defined, i.e., $$|S_x^2-S_wS_{x2}|>0$$

c) that diff<10 so that the fit is of relatively good quality; or d) that the track is long enough to establish a meaningful fitting, i.e., $$\max(|d_x|,|d_y|)\geq 2$$

To update a grid, first the existing information in the grid is compared with the newly obtained information, as follows:

$$p_{cont}=1-p_ge^{-f_c(ang\_g,ang\_f)}$$

where $p_g$ is the quality of the current information content in this grid, and $$f_c(ang\_g, ang\_f) = \begin{cases} |ang\_f - ang\_g|, & \text{if } |ang\_f - ang\_g| \leq \pi \\ 2\pi - |ang\_f - ang\_g|, & \text{if } |ang\_f - ang\_g| > \pi \end{cases}$$

The information quality is normalized by using:

$$p_{cur}=M_{fit}/(M_{fit}+p_{cont}+0.05)$$

where 0.05 accounts for unkonwns and for numerical stability, and pan defines the quality for newly obtained information. With $p_g$ representing the quality of information content in the original grid, then the information in the cells 44 is updated as follows (Bayesian):

(a) Heading:

grid.heading=(grid.heading $p_{cur}$+ang__$fp_g$)/($p_{cur}+p_g$)

(b) Quality:

grid.quality=$p_gp_{cur}/(p_gp_{cur}+(1-p_{cur})(1-p_g))$

Forward projection is used to look ahead of the current track to the region where this target has no history and to revive the history of the previous tracks. Basically the same technique used in 3.3 can be applied here. The difference lies in the stop condition. In back projection, well defined starting and ending points exist. However, in forward projection, no clearly defined ending point of the projection exists. Instead, we introduce the following two conditions:

(a) Stop Condition 1: Reach a point with no information, i.e.

grid.quality$\leq\xi,\xi\geq 0$.

(b) Stop Condition 2: Reach a grid where the information content is too different with the projection, i.e.

$$p_{cont} \geq T, T \geq 0.$$

Here T serves as a threshold

The operation of the track map generator 10 is illustrated in FIGS. 2 and 3. Referring to FIG. 2, a host vehicle 16 at first position 16.1 travels over a first trajectory 46 over a first period of time to a second position 16.2. Simultaneously, a first target vehicle 48 at first position 48.1 travels over a second trajectory 50 over the first period of time to a second position 48.2. The track of the first target vehicle 48 is measured by the radar system 14 and associated elements of the radar processing system 12 at associated sampling times 52. The second trajectory 50 intersects a first set of cells 54 that are updated by the track map generator 10.

Referring to FIG. 3, during a second period of time, the host vehicle 16 travels from the second position 16.2 to a third position 16.3 over the first trajectory 46, and simultaneously, a second target vehicle 58 at first position 58.1 travels over a third trajectory 60 to a second position 58.2. The track of the second target vehicle 58 is measured by the radar system 14 and associated elements of the radar processing system 12 at associated sampling times 54. The third trajectory 60 intersects a second set of cells 62, some of which are also of the first set of cells 56, that are updated by the track map generator 10. The resulting updated cells each contain an associated direction and quality representing a composite of the paths of the first 48 and second 58 target vehicles, relative to the host vehicle 16.

Figure 7:
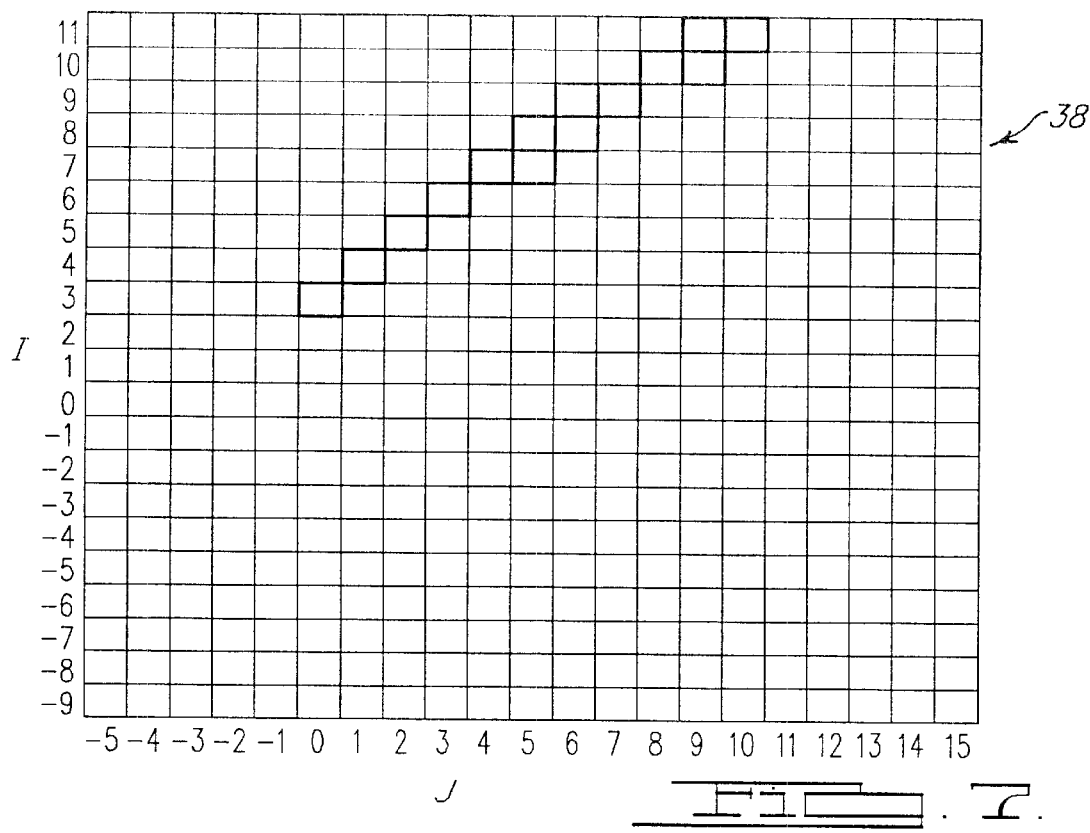
FIG. 7 illustrates an example of a target tracking situation during a first period of time, but with a host vehicle centered track map.
Figure 8:
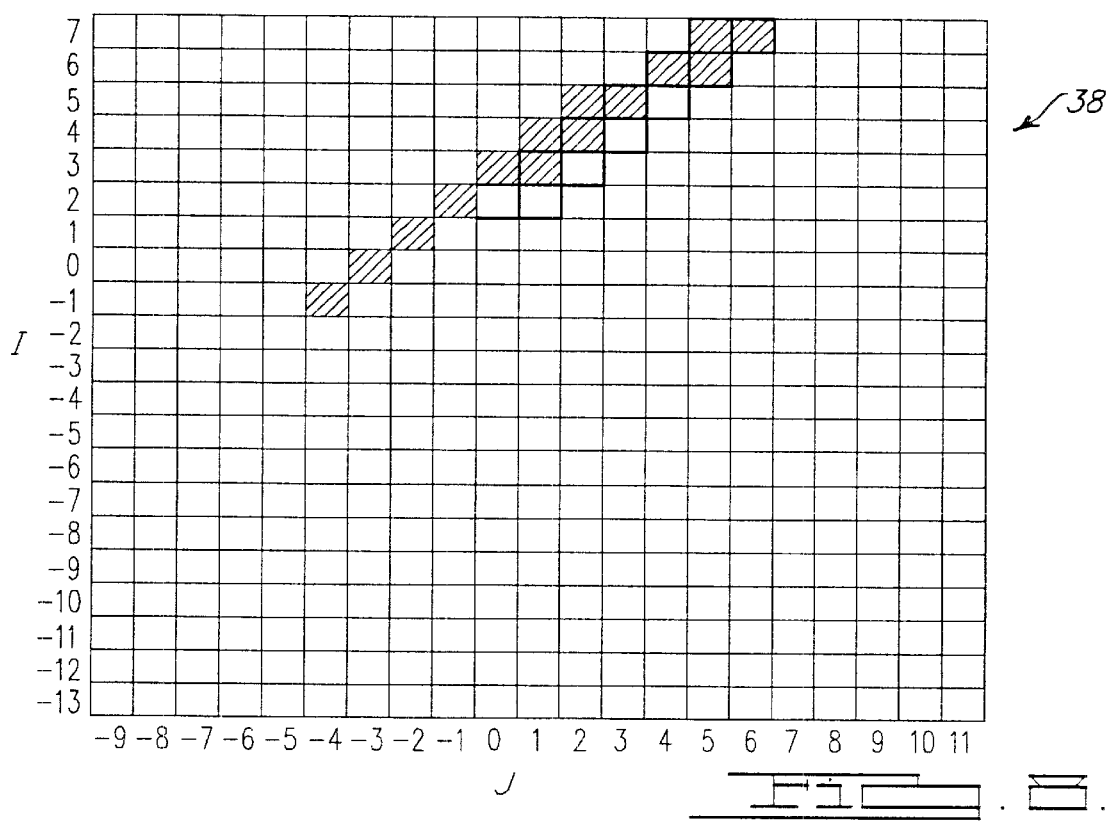
FIG. 8 illustrates an example of a target tracking situation during a second period of time after the first period of time of FIG. 7, but with a host vehicle centered track map.

FIGS. 2 and 3 illustrate track maps 38 with associated cells that are fixed in space, as may be suitable for used in conjunction with absolute navigation data. Referring to FIGS. 7 and 8—which correspond to the situations illustrated in FIGS. 2 and 3—the coordinate system of the track map may also be adapted to move with the host vehicle 16, so as to provide a map that is localized to the host vehicle 16.

While specific embodiments have been described in detail in the foregoing detailed description and illustrated in the accompanying drawings, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

I claim:

1. A method of generating a track map, comprising:

a. reading a first plurality of first data points, wherein each first data point of said first plurality of first data points is representative of a position of first tracked object;

b. generating a first representation of a path of said first tracked object, from said first plurality of first data points;

c. calculating at least one quality measure of said representation, wherein said at least one quality measure corresponds to at least one map coordinate;

d. calculating at least one heading measure from said representation, wherein said at least one heading measure corresponds to said at least one map coordinate; and e. storing said at least one quality measure and said at least one heading measures in a memory.

2. A method of generating a track map as recited in claim 1, wherein said first representation of said path is a mathematical representation selected from a linear fit of said first plurality of first data points, a curve fit of said first plurality of first data points, a Kalman smoothing of said first plurality of first data points, and an autoregression of said first plurality of first data points.

3. A method of generating a track map as recited in claim 1, wherein said at least one quality measure is responsive to a measure of fit by said representation of said first plurality of first data points.

4. A method of generating a track map as recited in claim 1, further comprising:

a. reading a first plurality of second data points, wherein each second data point of said first plurality of second data points is representative of a velocity of first tracked object, and said first plurality of second data points correspond in time to said first plurality of first data points; and b. calculating a first plurality of headings of said first tracked object from said first plurality of second data points, wherein said at least one quality measure is responsive to a heading error, wherein said heading error is responsive to a difference between at least one heading calculated from said first representation and at least one heading of said first plurality of headings.

5. A method of generating a track map as recited in claim 1, further comprising:

a. reading a first plurality of third data points, wherein each third data point of said first plurality of third data points is representative of a heading of first tracked object so that said first plurality of third data points are a first plurality of headings, said first plurality of third data points correspond in time to said first plurality of first data points, wherein said heading error is responsive to a difference between at least one heading calculated from said first representation and at least one heading of said first plurality of headings.

6. A method of generating a track map as recited in claim 1, further comprising modifying at least one stored quality measure responsive to at least one quality measure.

7. A method of generating a track map as recited in claim 1, further comprising modifying at least one stored heading measure responsive to at least one quality measure.

* * * * *

UNITED STATES PATENT AND TRADEMARK OFFICE
CERTIFICATE OF CORRECTION

PATENT NO. : 6,420,997 B1
DATED : July 16, 2002
INVENTOR(S) : Shan Cong

It is certified that error appears in the above-identified patent and that said Letters Patent is hereby corrected as shown below:

Column 1,
Line 51, -- are situations for which there is -- should be insterted before "or"; and
-- misinterpreting -- should be inserted before "collisions".

Column 2,
Line 30, ", is" should be changed to -- , which is --;
Line 31, "and for" should be changed to -- and a system for --; and
Line 58, "Application '035" should be changed to -- U.S. Application No. 09/009,035 now U.S. Pat. No. 6,085,151, --.

Column 4,
Line 25, "The he" should be changed to -- The --.

Column 5,
Line 9, "the history" should be changed to -- history --; and
Line 55, "dx and dy" should be changed to -- $d_x$ and $d_y$ --.

Column 6,
Line 35, "$q_{trk}$ is the quality of current track," should be deleted;
Line 52, "and" should be deleted; and
Lines 58-59, the equation should be changed to $$-- f(ang\_f, ang\_h) = \begin{cases} |ang\_f - ang\_h|, & if\ |ang\_f - ang\_h| < \pi \\ 2\pi - |ang\_f - ang\_h|, & if\ |ang\_f - ang\_h| \geq \pi \end{cases} --$$

Column 7,
Line 3, "The" should be changed to -- To --;
Line 10, the equation should be changed to $$-- M_{cons} = s_t e^{-2f(ang\_f, ang\_h)} -- ;$$

Line 34, "vx and vy" should be changed to -- $v_x$ and $v_y$ --;
Lines 34 and 35, "on x and y directions" should be changed to -- in the x and y directions respectively --; and
Line 45, the equation should be changed to $$-- M_{diff} = e^{-diff/4} -- .$$

UNITED STATES PATENT AND TRADEMARK OFFICE
CERTIFICATE OF CORRECTION

PATENT NO. : 6,420,997 B1
DATED : July 16, 2002
INVENTOR(S) : Shan Cong

It is certified that error appears in the above-identified patent and that said Letters Patent is hereby corrected as shown below:

Column 8,
Lines 2-3, the equation should be changed to $$-- f_d = 0.14 e^{-(n_r+1)/(|v|+6)} + 0.85 --$$.

Line 4, "v" should be changed to -- $v$ --;
Lines 35-37, the equation should be changed to $$-- f_c(ang\_g, ang\_f) = \begin{cases} |ang\_f - ang\_g|, & if\ |ang\_f - ang\_g| \leq \pi \\ 2\pi - |ang\_f - ang\_g|, & if\ |ang\_f - ang\_g| > \pi \end{cases} --$$

Line 43, "unknowns" should be changed to -- unknowns --;
Line 44, "pan" should be changed to -- $P_{cur}$ --; and
Line 59, "3.3" should be changed to -- backprojection --.

Column 9,
Line 7, "Here" should be changed to -- where --;
Line 7, a period (.) should be inserted after "threshold";
Line 26, "times 54" should be changed to -- times 52 --; and
Line 55, -- a -- should be inserted before "first tracked object".

UNITED STATES PATENT AND TRADEMARK OFFICE
CERTIFICATE OF CORRECTION

PATENT NO. : 6,420,997 B1
DATED : July 16, 2002
INVENTOR(S) : Shan Cong

It is certified that error appears in the above-identified patent and that said Letters Patent is hereby corrected as shown below:

<u>Column 10,</u>
Lines 2, 5 and 19, -- first -- should be inserted before "representation"; and
Lines 25 and 40, -- said -- should be inserted before "first tracked".

Signed and Sealed this

First Day of March, 2005

JON W. DUDAS
*Director of the United States Patent and Trademark Office*